United States Patent [19]

Saikalis

[11] Patent Number: 5,355,855
[45] Date of Patent: Oct. 18, 1994

[54] INTEGRATED FEED FORWARD AIR/FUEL RATIO SENSOR FOR GASEOUS FUEL ENGINES

[75] Inventor: George Saikalis, West Bloomfield, Mich.

[73] Assignee: Hitachi America, Ltd., Tarrytown, N.Y.

[21] Appl. No.: 172,748

[22] Filed: Dec. 27, 1993

[51] Int. Cl.⁵ .................... F02M 7/00; F02M 21/04
[52] U.S. Cl. ....................... 123/438; 123/527; 123/478
[58] Field of Search ............... 123/357, 438, 497, 478, 123/527, DIG. 12; 73/23.32, 25.03

[56] References Cited

U.S. PATENT DOCUMENTS

| | | | |
|---|---|---|---|
| 3,933,135 | 1/1976 | Zillman et al. | 123/478 |
| 4,372,278 | 2/1983 | Smith | 123/478 |
| 4,865,001 | 9/1989 | Jensen | 123/27 GE |
| 5,085,576 | 2/1992 | Bonne et al. | 431/22 |
| 5,140,959 | 8/1992 | Purbin | 123/527 |
| 5,150,690 | 9/1992 | Carter et al. | 123/527 |
| 5,203,305 | 4/1993 | Porter et al. | 123/527 |
| 5,237,981 | 8/1993 | Polletta et al. | 123/527 |
| 5,251,602 | 10/1993 | Kurihare et al. | 123/527 |

Primary Examiner—E. Rollins Cross
Assistant Examiner—Erick Solis
Attorney, Agent, or Firm—Gifford, Groh, Sprinkle, Patmore and Anderson

[57] ABSTRACT

An integrated air/fuel sensor is disclosed for use with a gaseous fuel internal combustion engine. The sensor includes a housing having a mass air flow sensor which provides an output signal representative of the mass of air flow through the mass air flow sensor. Similarly, a mass gas sensor is also contained in the housing which provides an output signal representative of the mass of gas flow through the mass gas flow sensor. The integrated air/fuel sensor is mounted to the air and fuel supply system for the engine upstream from the internal combustion engine. The output signal from both flow sensors are provided as input signals to a circuit which calculates the air/fuel ratio to the engine and provides an output signal representative thereof to the fuel management system for the engine.

12 Claims, 4 Drawing Sheets

INTEGRATED FEED FORWARD AIR/FUEL RATIO SENSOR FOR GASEOUS FUEL ENGINES

BACKGROUND OF THE INVENTION

I. Field of the Invention

The present invention relates generally to fuel control systems for internal combustion engines and, more particularly, an improved air/fuel sensor for gaseous fuel engines.

II. Description of the Prior Art

Internal combustion engines utilizing gaseous fuel, such as compressed natural gas, LNG and the like, are generally advantageous since gaseous fuels are generally clean burning fuels. As such, gaseous fuels for the most part generate less noxious emissions than other fuels and, as such, are able to meet increasingly rigorous governmental regulations.

In order to minimize noxious emissions for gaseous fuel engines, it is necessary to control the air/fuel ratio at or near a selected point, such as the stoichiometric point or a lean burn point. For example, the air/fuel ratio equals 17 at the stoichiometric point for compressed natural gas.

In order to monitor the air/fuel ratio in the previously known gaseous fuel engines, a lambda or oxygen sensor is positioned in the exhaust gas stream from the engine. The lambda sensor detects the presence of oxygen in the exhaust gas from the engine which, in turn, is representative of the air/fuel ratio for the engine.

One disadvantage of these previously known engines, however, is that the air/fuel ratio for the engine is only determined after the engine combustion has occurred. Consequently, there is a lag time between the time the combustion occurred and the time when adjustments can be made to the fuel supply for the engine in order to return the engine combustion to the selected point. This lag time disadvantageously increases undesirable engine emissions in the exhaust gas stream.

SUMMARY OF THE PRESENT INVENTION

The present invention provides an improved integrated air/fuel sensor for gaseous engines which overcomes all of the above mentioned disadvantages of the previously known devices.

In brief, the present invention comprises a housing having a mass air flow sensor within the housing which generates a first output signal representative of the mass of air flow through the mass air flow sensor. Similarly, a mass gas flow sensor is also contained in the housing and generates a second output signal representative of the mass of gas flow through the mass gas flow sensor.

The housing is mounted in the air/fuel supply system for the engine upstream from the combustion chamber(s). Consequently, the mass air flow sensor is mounted in the engine air intake means for the engine while, similarly, the mass gas flow sensor is mounted in the gas supply system for the engine.

An electronic circuit is also mounted in a module on the housing. The circuit receives the first and second output signals from the air flow sensor and gas flow sensor, respectively, and, in response thereto, generates an output signal representative of the air/fuel ratio for the engine. Preferably, the electronic circuit is microprocessor based.

Since the sensor of the present invention calculates the air/fuel ratio of the fuel charge provided to the engine upstream from the combustion chamber, the sensor of the present invention provides a feed forward signal indicative of the air/fuel ratio of the fuel supply to the engine. This signal is provided to the engine control unit (ECU) which controls the fuel supply system to the engine so that the fuel supply can be maintained at or near the selected point for combustion during all engine operating conditions.

BRIEF DESCRIPTION OF THE DRAWINGS

A better understanding of the present invention will be had upon reference upon the following detailed description when read inconjunction with the drawing, wherein like reference characters refer to like parts through out the several views, and in which.

DETAILED DESCRIPTION OF A PREFERRED EMBODIMENT OF THE PRESENT INVENTION

Figure 1:
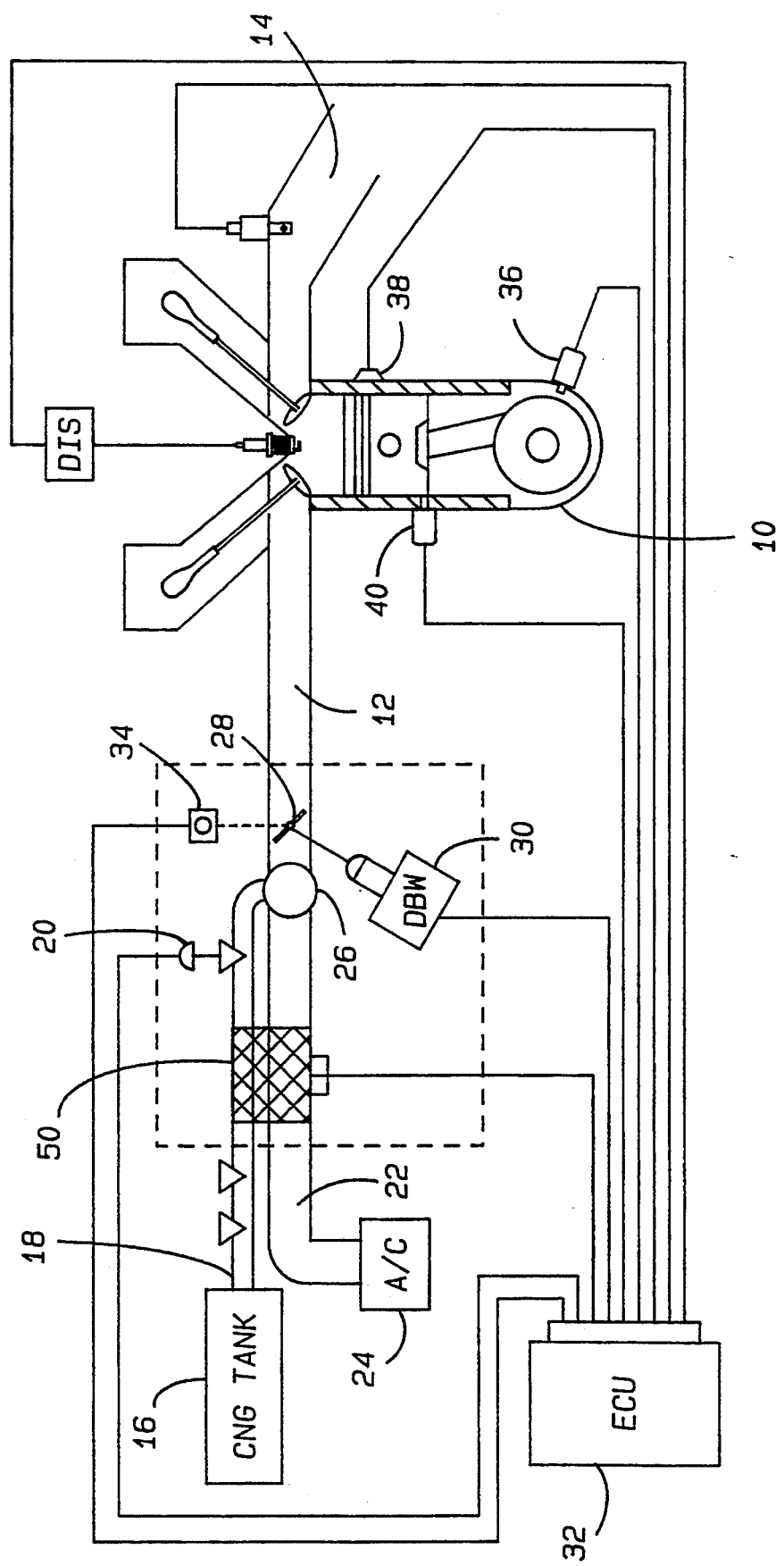
FIG. 1 is a diagrammatic view illustrating a preferred embodiment of the present invention.

With reference first to FIG. 1, an internal combustion engine 10 having an intake passageway 12 and an exhaust passageway 14 is thereshown diagrammatically. A source 16 of gaseous fuel, such as compressed natural gas, LNG or the like is contained in a pressurized container. The gaseous fuel source 16 provides fuel to the intake passageway 12 via a fuel supply passageway 18. A variable proportional or duty valve 20 is contained within the fuel supply passageway 18 to control the mass of fuel supply from the source 16 to the intake passageway 12.

Intake air is also supplied through an air intake passageway 22 to the intake passageway 12 from an air cleaner 24. The air intake passageway 22 and fuel passageway 18 join at a mixing chamber 26 in which the gaseous fuel and air are intermixed together to form a combustible charge for the engine. Any conventional mixing chamber 26 can be used.

A throttle valve 28, is contained in the intake passageway 12 immediately downstream from the mixing chamber 26. The opening of the throttle 28 is controlled by a drive by wire servo-mechanism 30 which is controlled by output signals from an engine control unit (ECU) 32 for the engine. The ECU 32 also receives a plurality input signals from engine sensors. These input signals include an input signal from a throttle position sensor 34, a rotational RPM sensor 36, a knock sensor 38 and a coolant temperature sensor 40. The ECU 32 is also preferably microprocessor based and, in addition to controlling the position of the drive by wire servo-mechanism 30, also controls the duty cycle GV % of the opening of the proportional valve 20 and thus the amount of gaseous fuel supplied to the engine.

Figure 2:
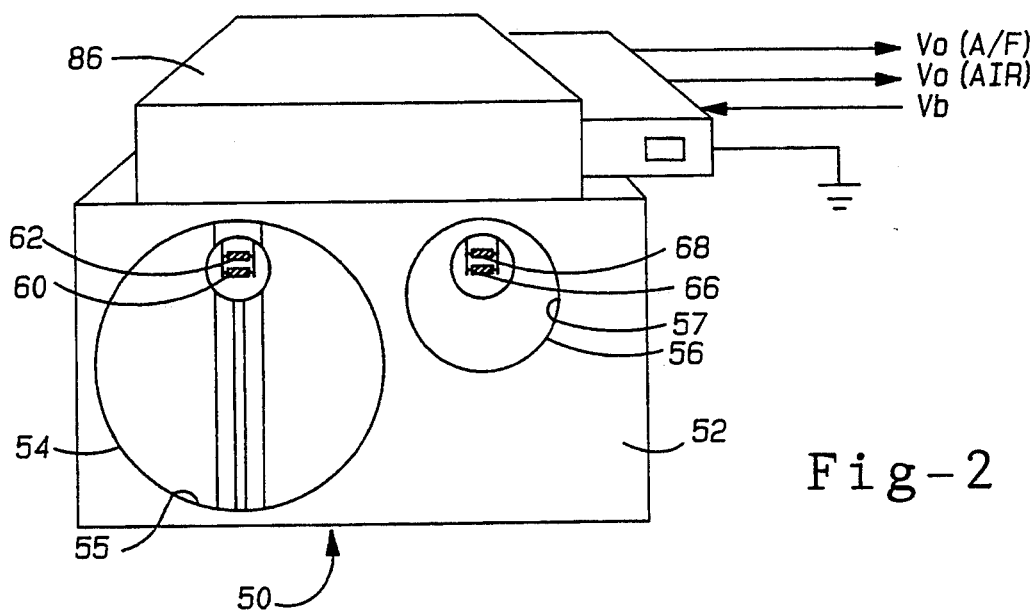
FIG. 2 is an exploded view illustrating a preferred embodiment of the integrated sensor of the present invention.

With reference now to FIGS. 1 and 2, the fuel management system for the engine 10 also includes an integrated air/fuel sensor 50 having a housing 52. A mass air flow sensor 54 having an air flow passageway 55 is contained within the housing 52 while a mass gas flow sensor 56 having a gas flow passageway 57 is also contained within the housing 52 and preferably closely adjacent the air flow sensor 54.

As best shown in FIG. 2, the mass air flow sensor 54 includes both a hot wire 60 and a cold wire 62. In the conventional fashion, the current in the hot wire 60 varies as the function of the air flow through the air sensor passageway 55.

Similarly, the gas flow sensor 56 also is a hot wire sensor having both a hot wire 66 and a cold wire 68. In the well known fashion, the current in the hot wire 66 varies as a function of the gas flow through the gas flow sensor passageway 57.

Referring again to FIGS. 1 and 2, the sensor housing 52 is mounted within the fuel system for the engine 10 such that the air flow passageway 55 is mounted in series with the air intake passageway 22. Consequently, all the air supply to the engine 10 passes through the passageway 55. Similarly, the gas passageway 57 is mounted in a line with the gas supply passageway 18 from the fuel source 16 so that all of the gaseous fuel supply to the engine 10 passes through the passageway 57.

Figure 3:
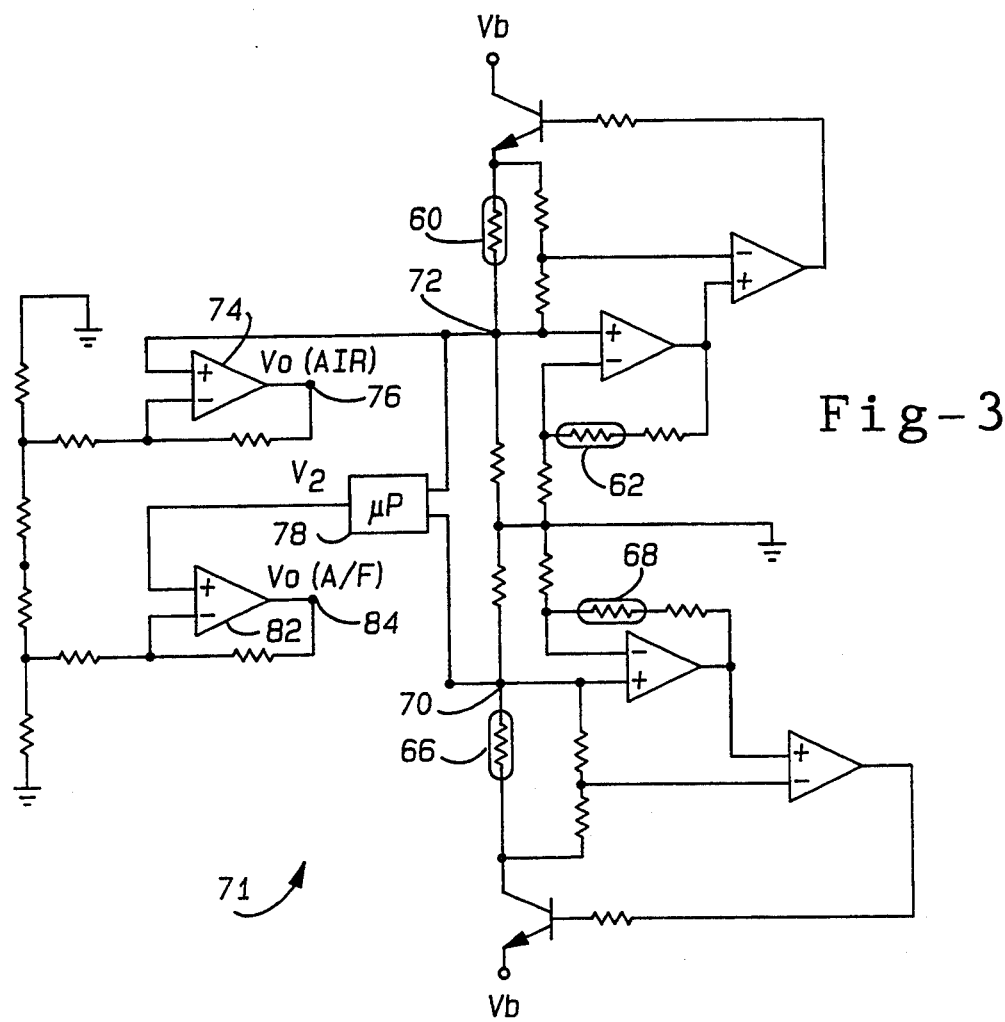
FIG. 3 is a circuit diagram illustrating a portion of the preferred embodiment of the present invention.

With reference now to FIGS. 2 and 3, hot and cold wires 60, 62, 66 and 68 all form a portion of the electronic circuit 71 illustrated in FIG. 3. The circuit 71 is conventional in that the circuit 71 provides a voltage $V2_G$ at node 70 proportional to the mass gas flow to the gas sensor passageway 57 and a voltage $V2_A$ at node 72 representative of the mass air flow through the sensor passageway 55. The mass air flow voltage $V2_A$ at node 72 is amplified by amplifier 74 which in turn provides an output $V_O(air)$ at its output 76.

The voltages $V2_G$ and $V2_A$ at node 70 and 72 are also provided as input signals to a microprocessor 78. The microprocessor 78 is programmed to calculate the air/fuel ratio $V_2$ on its output 80. The air/fuel ratio $V_2$ is amplified by amplifier 82 which provides an output signal $V_O(A/F)$ at its output 84 indicative of the air/fuel ratio passing through the integrated sensor 50. The output signal $V_O(air)$ and $V_O(A/F)$ are then provided as output signals to the ECU 31 (FIG. 1).

Still referring to FIGS. 2 and 3, the electronic circuit, 71 is preferably contained within a module 86 which is directly mounted to the integrated sensor housing 52. As such, both the sensor 52 together with its circuit module enjoy an overall compact construction.

Figure 4:
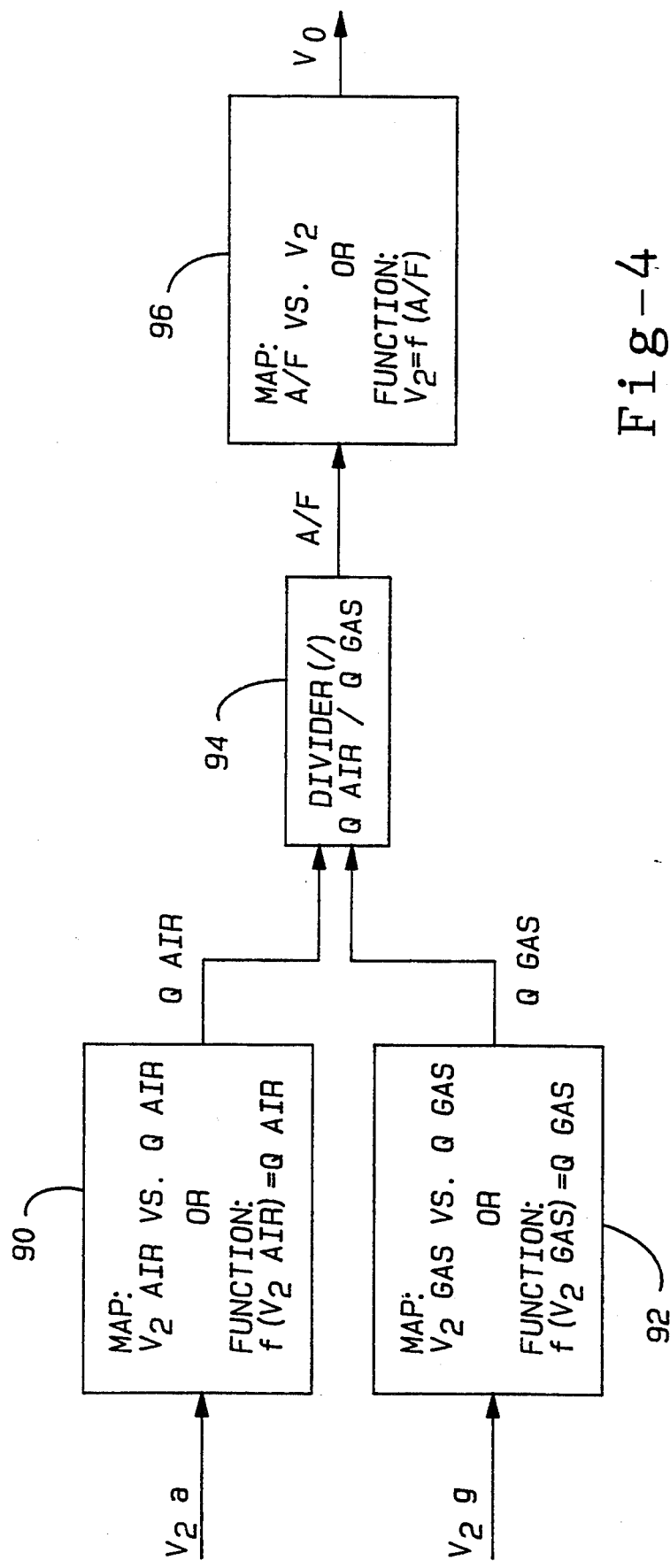
FIG. 4 is a flow chart for the circuit of FIG. 3.

With reference now to FIG. 4, a flow chart illustrating the operation of the microprocessor 78 (FIG. 3) in the sensor circuit module is thereshown. At step 90, the program receives the value $V2_A$ representative of the mass air flow at node 72 (FIG. 3). Step 90 then converts the voltage $V2_A$ into the mass of air flow through the sensor passageway 55 through either an internal map of $V2_A$ versus mass air flow or by a calculated function of $V2_A$, i.e. f $(V2(air))=Qair$.

Similarly, at step 92, the microprocessor determines the mass of gas flow as a function of the voltage $V2_G$ from node 70 (FIG. 3) in the circuit. The mass of gas flow can then be determined either through an internal map or by a calculated function of $V2_A$, i.e. $f(V2(gas))=-Qgas$, to yield the mass gas flow.

Steps 90 and 92 then both proceed to step 94 which divides the air mass by the gas mass which generates a value proportional to the air/fuel ratio of the engine. Step 94 then proceeds to step 96 in which the air fuel ratio for the engine is determined, again through either an internal map or by a calculated function, and the voltage of value of $V_2$ is then generated by the microprocessor 78. This voltage value $V_2$ is amplified by amplifier 82 (FIG. 3) to produce the voltage $V_O(A/F)$ indicative of the air/fuel ratio for the engine.

Figure 5:
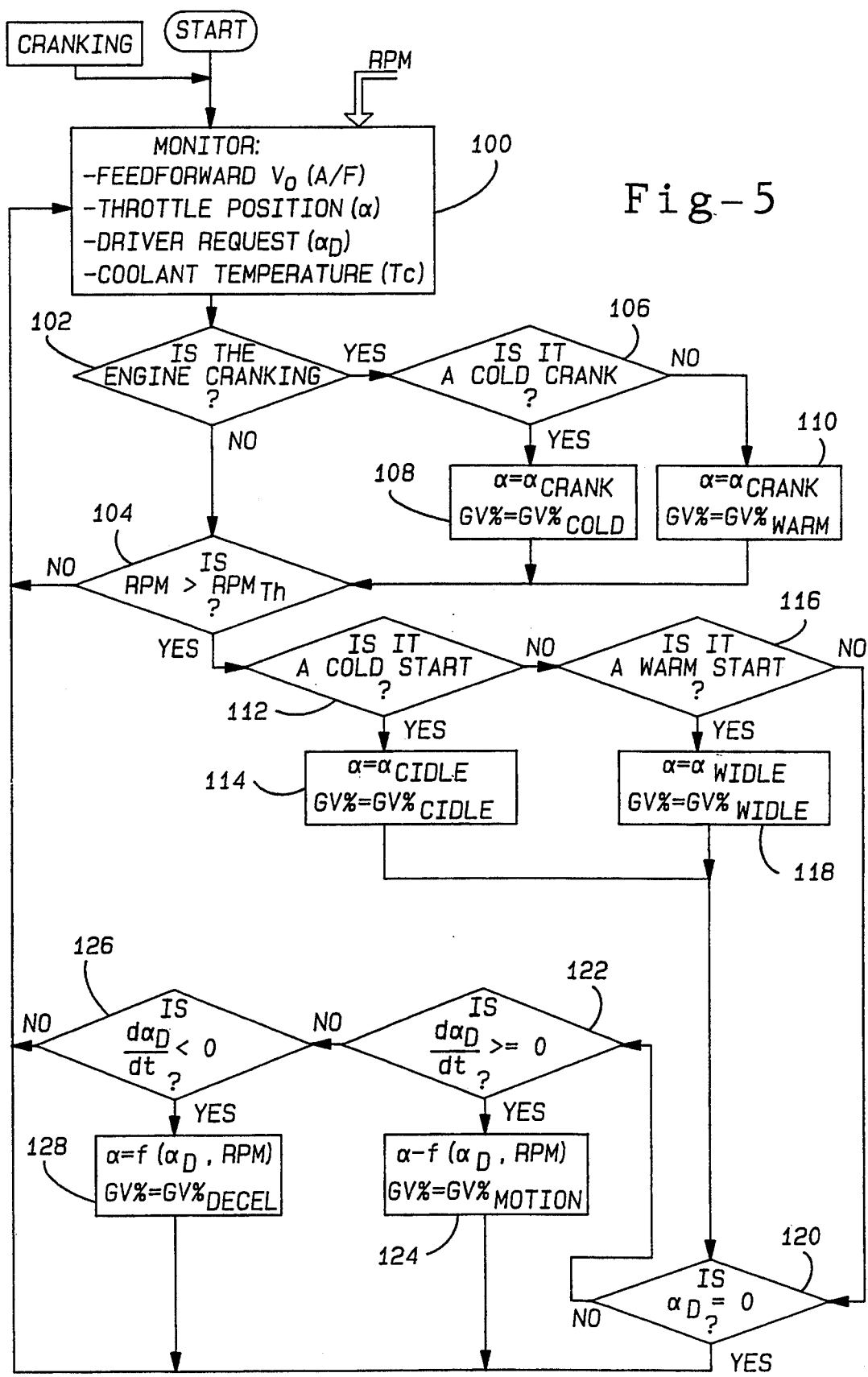
FIG. 5 is a flow chart illustrating the operation of the fuel management system of the preferred embodiment of the present invention.

With reference now to FIG. 5, a flow chart is thereshown for controlling the overall fuel system for the engine. At step 100, the ECU 32 reads the signal $V_O$ (A/F) indicative of the air/fuel ratio for the engine from the integrated sensor 50. Step 100 also reads the throttle position ($\alpha$), the driver requested position ($\alpha_D$) and the coolant temperature ($T_C$). Step 100 then branches to step 102.

At step 102, the program determines if the engine is cranking. If not, step 102 branches to 104 which compares the RPM with a predetermined threshold $RPM_{TH}$. If the rpm of the engine is less than the threshold value $RPM_{TH}$, step 104 branches back to step 100 and the above process is repeated.

Conversely, if the engine is cranking, step 102 instead branches to step 106 to determine if a cold cranking condition exists. If a cold cranking condition exists step 106 branches to step 108 in which the throttle position alpha is set to a preset value $\alpha_{CRANK}$. Similarly, the variable GV % which represents the duty cycle of the proportional valve 20 (FIG. 1) for the engine, is set to a preset value GV % $_{COLD}$. Step 108 then branches to step 104.

Conversely, if a warm cranking condition exists, step 106 instead branches to step 110 in which the throttle position $\alpha$ is set to a constant $\alpha_{CRANK}$. Unlike step 108, however, step 110 sets the duty cycle GV % to a preset constant GV % $_{WARM}$ and then step 110 branches to step 104.

Assuming that the engine is started and that the RPM is greater than the threshold $RPM_{TH}$, step 104 branches to step 112 which determines if a cold starting condition is present. If so, step 112 branches to step 114 where the throttle position $\alpha$ is set to a constant $\alpha_{C\,IDLE}$. Step 114 also sets the variable GV % to the constant GV % $_{C\,IDLE}$.

Conversely, if a cold start condition is not present, step 112 branches to step 116 which determines if a warm start condition is present. If so, step 116 branches to step 118 in which the throttle position $\alpha$ is set to the constant $\alpha_{W\,IDLE}$ and the duty cycle GV % to GV $_{W\,IDLE}$.

If neither a warm or cold idle is present, or after the throttle position $\alpha$ and duty cycle GV % variables are set by steps 114 and 118 the programs branches to step 120 which determines if the throttle demanded position $\alpha_D$ equals zero if so, step 120 branches to step 100 where the above process is repeated. If not, indicative that the throttle is at least slightly depressed, step 120 branches to step 122.

At step 122, the program determines if the change of the throttle position is greater than zero, indicative of increase depression of the throttle. If so, step 122 branches step 124 where the throttle position $\alpha$ as determined by the drive by wire servo-mechanism 30 (FIG. 1 ) is set of the function of the demanded throttle position $\alpha_D$ and engine RPM. Step 124 also sets the duty cycle for the gas valve equal to preset constant GV % $_{MOTION}$.

If the throttle is not being depressed, step 122 branches to step 126 which determines if the change of the throttle depression is less than zero, indicative that the throttle is being released. If so, step 126 branches to step 128 which sets the throttle position $\alpha$ through the drive by wire servo-mechanism 30 as a function of the demand throttle position $a_D$ and engine RPM. The duty cycle for the gas valve GV % is also set to a constant GV % $_{DECELERATION}$.

If the throttle position remains constant but greater; than zero, step 126 branches to step 100 where the above process is repeated.

From the foregoing, it can be seen that the integrated air/fuel sensor 50 together with the fuel management system enjoys a number of advances over the previously known devices. One such advantage is that the integrated sensor 50 provides a compact construction and a fast forward calculation of the air/fuel ratio for the engine prior to engine combustion. Consequently, the air/fuel sensor 50, especially when used in conjunction with a drive by wire system utilizing a drive by wire servo-mechanism 30 to control the position of the throttle, combustion can be maintained at or near a preselect point, e.g. the stoichiometric point (air/fuel equal 17 for CNG), in order to reduce engine emissions during preselected engine operating conditions, such as deceleration and idle.

In addition to lower emission by maintaining the engine combustion substantially at stoichiometric, better fuel economy can also be obtained by the system of the present invention. Additionally, the drive by wire system allows the idle speed valve to be eliminated and the drive by wire system also facilitates the cruise control and traction control.

Additionally, since the mass air flow sensor and gas flow sensor are contained within the same housing, thermal transfer occurs between the air and the fuel. In operation, the gas cools the air while the air warms the gas. Cool air allows greater volume of air to be supplied to the engine for better engine efficiency.

A still further advantage of the present invention is that the sensor 50 provides an output signal indicative of the air/fuel ratio for the engine in real time and without the lag time of the previously known oxygen sensors. The computation of the air/fuel ratio in the circuit for the sensor itself also eliminates the necessity of the computation of the air/fuel ratio by the ECU.

Having described my invention, however, many modifications thereto will become apparent to those skilled in the art to which it pertains without deviation from the spirit of the invention as defined by the scope of the appended claims.

I claim:

1. An integrated air/fuel sensor for a gaseous fuel internal combustion engine having a fuel supply system with an air intake passage means, said sensor comprising:

a housing, a mass air flow sensor contained in said housing, said mass air flow sensor providing a first output signal representative of the mass of air flow through the mass air flow sensor, a mass gas flow sensor contained in said housing, said mass gas flow sensor providing a second output signal representative of the mass of gas flow through the mass gas flow sensor, means for mounting said housing in the fuel supply system so that said mass air flow sensor is fluidly connected in series with the air intake passage means and said mass gas flow sensor is fluidly connected in series with the fuel intake passage means, means responsive to said first and second outputs for computing and generating a third output signal representative of the air/fuel ratio for the fuel system.

2. The invention as defined in claim 1 wherein said mass air flow sensor is a hot wire sensor.

3. The invention as defined in claim 1 wherein said mass gas flow sensor is a hot wire sensor.

4. The invention as defined in claim 1 wherein said computing means comprises a microprocessor.

5. The invention as defined in claim 4 wherein said microprocessor is mounted onto said housing.

6. The invention as defined in claim 1 wherein said mass air flow sensor and said mass gas flow sensor are contiguously mounted together so that said sensors mutually thermally conduct.

7. The invention as defined in claim 1 wherein the engine includes a throttle valve and a fuel management system, said fuel management system comprising means for receiving said third output signal and for generating a throttle position signal and comprising means responsive to said throttle position signal for controlling the position of said throttle valve.

8. The invention as defined in claim 7 and comprising a throttle position sensor which produces an output signal indicative of the position of the throttle as an input signal to said fuel management system.

9. The invention as defined in claim 7 wherein said fuel management system comprises a variable gas valve for controlling the mass of gas flow through the gas intake means, a variable air valve for controlling the mass of air flow through the air intake means, said fuel management system providing output signals to said valves for controlling the position of said valve as a function of preselected engine conditions.

10. The invention as defined in claim 9 wherein said fuel management system comprises means for generating output signals to said valves to maintain the engine combustion at substantially a preselected air/fuel ratio during preselected engine operating conditions.

11. The invention as defined in claim 10 wherein said preselected engine operating condition comprises an idle operating condition.

12. The invention as defined in claim 10 wherein said preselected engine operating condition comprises a deceleration operating condition.

* * * * *